United States Patent [19]
Cohen et al.

[11] Patent Number: 4,588,263
[45] Date of Patent: May 13, 1986

[54] AN ADJUSTABLE-OPTICAL PRISM WITH INTEGRAL-POLARIZING BEAM SPLITTER AND APPLICATIONS THEREOF

[75] Inventors: Donald K. Cohen; Raymond Yardy, both of Tucson, Ariz.

[73] Assignee: International Business Machines Corporation, Armonk, N.Y.

[21] Appl. No.: 606,008

[22] Filed: May 2, 1984

[51] Int. Cl.[4] .......................... G02B 5/30; G02B 5/04
[52] U.S. Cl. ..................................... 350/401; 350/286
[58] Field of Search ............... 350/286, 401, 500, 436

[56] References Cited

U.S. PATENT DOCUMENTS

| | | | |
|---|---|---|---|
| 3,253,525 | 5/1966 | Merkel | 350/436 |
| 3,884,548 | 5/1975 | Linder | 350/500 |
| 4,333,173 | 6/1982 | Yonezawa et al. | 350/286 |

FOREIGN PATENT DOCUMENTS 897795  9/1943  France .

Primary Examiner—Bruce Y. Arnold
Attorney, Agent, or Firm—H. F. Somermeyer

[57] ABSTRACT

An optical device, such as an optical digital data recorder, includes a variable optical wedge in the light path. The variable wedge facilitates assembly by a two-step adjustment process; the first step aligns a light receptor portion to receive an input light beam at an angle so as to remove ellipticity from the input beam while the second subsequent step adjusts the wedge assembly to align a transmit and reflected light path for optically coupling the wedge to a record medium. The receptor portion includes a semicircular cross-sectioned lens movable disposed in a mating cavity for adjusting the angle of reception independently of the reflected wave position.

11 Claims, 4 Drawing Figures

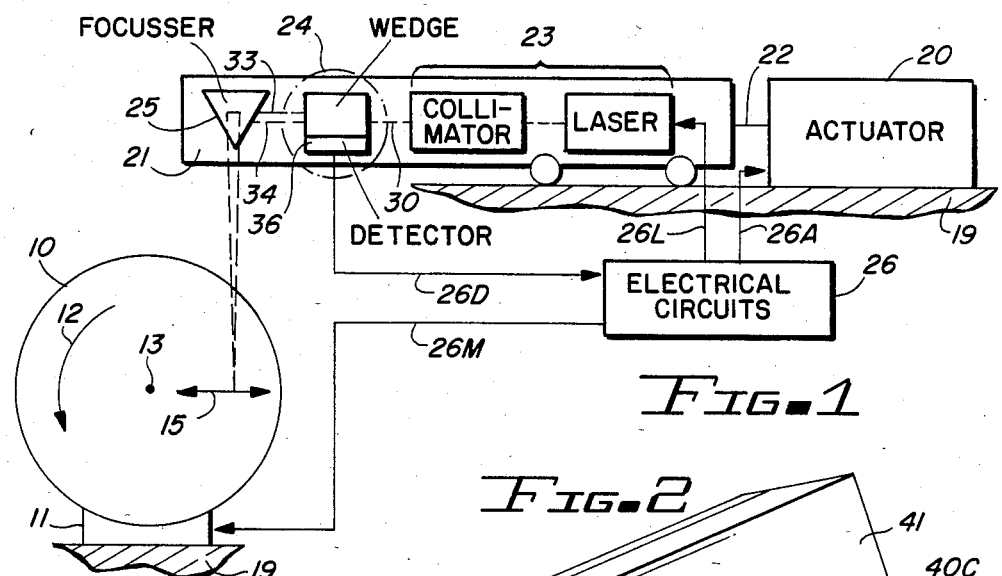
FIG-1
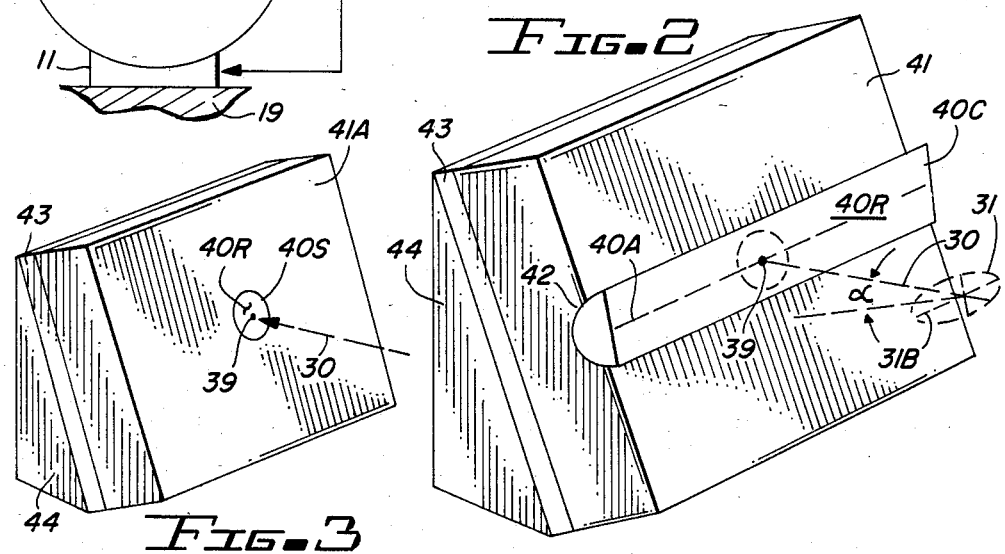
FIG-2
FIG-3
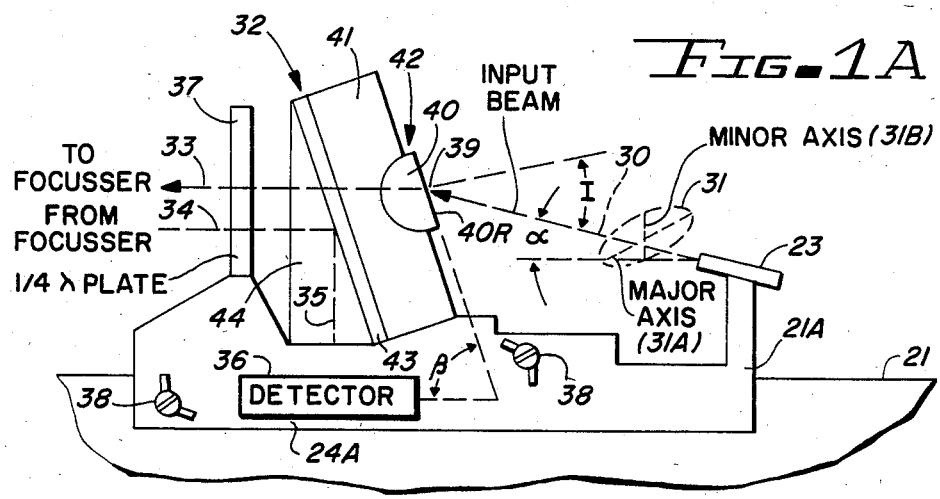
FIG-1A

AN ADJUSTABLE-OPTICAL PRISM WITH INTEGRAL-POLARIZING BEAM SPLITTER AND APPLICATIONS THEREOF

FIELD OF THE INVENTION

The present invention relates to optical systems particularly those optical systems usable with optical data recorders.

BACKGROUND OF THE INVENTION

A lot of research and development activity has occurred for optical disk data recording wherein a laser system supplies a collimated light beam which is employed for recording data and for reading data recorded from a rotating optical record disk. An expensive portion of such data recorders is in the optical light path which includes optical wedges, beam splitters, a focus detector and a data modulator and detector. It is therefore advantageous to have a simplified and facile manufacturing method of assembling such wedges and beam splitters into such optical systems. In particular, it is desirable to make as many adjustments as possible independent of any other adjustments during fabrication or maintenance.

Another aspect, particularly for optical data recorders, concerns the shape of the recording and read back light beam. Generally a collimated diode or semiconductive laser beam from a semiconductive or diode laser has an elliptical shape. Such a shape is not conducive to maximizing data storage densities on an optical disk; a circular beam is desired. Accordingly, it is another object of the invention to provide a simplified beam-shape converter which is provided in conjunction with the aforementioned object.

Optical wedges have been employed in various types of optical devices for many years. For example, Linder U.S. Pat. No. 3,884,548, shows an optical wedge which transmits light to a mirror which in turn reflects the light at a given angle for stabilizing the optical system. According to the Linder patent, the optical wedge consists of an convex lens movably disposed in a concave cavity such that the two parts can be adjusted for changing the angle of the surfaces of the wedge. The light is transmitted first through the member having the concave cavity and then through the convex lens to the mirror.

Merkel, U.S. Pat. No. 3,253,525, shows another optical wedge which does not change the shape of the beam. The wedge itself is constructed similarly to the Linder illustrated wedge, but provides for relative movement between an image source and a convex lens while maintaining the spatial relationship between the concave member and the source, i.e. the concave member moves with respect to a fixed planar-convex lens; in other words, the planar surface of the planar convex lens is always maintained parallel to a given surface such that when any movement of the concave member there is a continuous correction of the image viewed at the focal point of the planar-concave lens. In other words, the shape of what is being viewed is maintained.

France Pat. No. 897,795 (published Mar. 30, 1945) shows a coin operated telescope with a variable optical wedge. The semicircular lens is rotated about a point which is the point of image input; this avoids any reflections from interfering with the viewing.

SUMMARY OF THE INVENTION

In accordance with the invention an adjustable or variable optical prism or wedge includes an optical input member having a semicircular shape. The semicircular shape can be either a hemicylinder or a hemisphere. The input member consists of transparent material exhibiting given optical properties typical of present-day quality optical glasses and including a given index of refraction.

A semicircular convex-output surface of the input member has a given radius about a given point. The point lies on the input surface and the arrangement is such that the incident input light beam is centered on the given point; the input member is rotatable about that given point.

In movable contact with the input member is an optical transmitting member which has a concave semicircular cavity for slideably receiving the convex output surface; the cavity surface has the same radius circumscribing a circular area about the given point of said input member. The transmitting member has the same type of transparent material and optical properties as the input member. The transmitting member also has an output surface upon which a polarization sensitive coating resides for reflecting or deflecting light impinging on the coating while permitting transmission of light received by the input member and transmitted through the optical transmitting member.

A triangular wedge can be affixed to the polarization coating. It is preferred that the triangular wedge have the same optical properties as the other members in the variable wedge system. The variable wedge system is preferably employed in an optical disk data recording device. The assembly of the device includes incorporating the variable wedge system, which has a laser source mounted therewith; by first adjusting the input member within the semicircular cavity with respect to the laser source such that the output shape of the transmitted light is circular rather than elliptical. Then, the triangular prism or the transmitting member such that the light transmitted from the variable wedge system and the reflected wave impinging upon the polarization coating having a predetermined relationship to the recording member and an optical detector.

The foregoing and other objects, features, and advantages of the invention will be apparent from the following more particular description of a preferred embodiment of the invention, as illustrated in the accompanying drawings.

BRIEF DESCRIPTION OF THE DRAWING

FIG. 1 illustrates an optical data recorder employing the present invention with an enlarged view of the variable wedge constructed in accordance with the present invention.

FIG. 1A illustrates an adjustable mount for the laser-detector optics for the FIG. 1 illustrated recorder.

FIGS. 2 and 3 diagrammatically illustrate two variations on the optical wedge assembly as shown in FIG. 1.

DETAILED DESCRIPTION

Referring now more particularly to the drawing, like numbers indicate like parts and structural features in the various diagrams. An optical disk data recorder employing the present invention includes an optical record member 10, hereafter referred to as disk 10, mounted for rotation on a motor 11. Motor 11 in turn is fixed to a frame 19 of the peripheral data recorder. Disk 10 rotates in the direction of arrow 12 about an axis of rotation 13. The disk 10 may contain a single spiral track for receiving and storing data signals or may have a series of concentric tracks. In either arrangement, double-headed arrow 15 represents the data recording area of disk 10.

Frame 19 also supports an actuator 20 which is coupled to head arm 21 by connecting rod 22. The arrangement is such that head arm 21 reciprocates radially with respect to disk 10, in a usual maner. Typically, head arm 21 may contain most of the optics and some of the electronics associated with the optical disk data recorder. For purposes of illustration, the size of the head arm 21 in FIG. 1 is greatly enlarged with respect to the other elements of the optical disk data recorder. Collimated laser source 23, which includes a separate collimator and laser, can be mounted in the head arm as diagrammatically illustrated in the drawing. The collimated beam 30 impinges on variable wedge and beam splitter 24 (details later), passes through one-fourth wavelength plate (light-polarization adjusting member) 37 (FIG. 1A) travels along path 33 through focusser 25 and then to optical disk 10. As shown in FIG. 1A, source 23, wedge and splitter 24 and detector 36 are preferably mounted on intermediate frame 24A adjustably supported arm 21 by machine screws 38.

For recording data on optical disk 10, the laser beam has a certain high energy well known in the optical disk recorder art. For sensing data stored on optical disk 10, the laser beam has a lower energy level, as is known. In either instance, some of the energy in the laser beam impinging on disk 10 is reflected, with an accompanying change in the wavelength of the beam, to focusser 25, then along path 34 through one-fourth wavelength plate 37 and back to wedge 24. As is known, wedge 24 deflects the reflected beam to detector 36. Detector 36 can be used for focus control, track following and data detection for either read-afterwrite or read-only operations. The construction of detector 36 can follow the usual practices and hence is not described in detail for that reason.

Optical disk data recorder 10 includes electrical circuits 26 which not only control actuator 20 as indicated by line 26A, but also the laser in source 23 as indicated by line 26L and receives signals from the detector 36 as indicated by line 26D and controls motor 11 as indicated by line 26M. Electrical circuits 26 are also connected to external means (not shown), such as a host processor. These circuits also process data signals to be recorded on disk 10 or read from disk 10 in a usual manner.

FIG. 1A includes an expanded showing of wedge-detector system 24. In system 24, variable optical wedge 32 receives the collimated elliptical (a two-to-one ration ellipse, for example) beam 30 at an angle alpha with respect to reference line in head-arm assembly 21 and transmits the beam as a nominally circular (out-of-round ratio of about 1.1 to 1.0 may be expected) beam over path 33. The light beam reflected from disk 10 is received over path 34 and is deflected by wedge 32 over light path 35 to detector 36.

Wedge 32 includes a semicircular laser 23 beam receptor member 40 which receives the elliptical beam centered at its pivot point 39. Beam 30 has an elliptical shape 31 with a minor axis 31B aligned as shown and a major axis 31A. The minor axis 31B is parallel to the angle alpha on the receptor surface 40R of receptor member 40. Receptor member 40 is movably supported in outwardly opening semicircular concave cavity in light or optical transmitting member 41 such that it can be pivoted about pivot point 39. This pivoting changes the angle of incidence I of beam 30 with respect to the input surface of receptor member 40. An increase in the angle of incidence elongates the projection of minor axis 31B on the receptor surface. Since the major axis 31A extends parallel to the pivoting of receptor member 40, about pivot point 39, as will become apparent, its projected length on receptor surface 40R remains constant. Receptor or input member 40 refracts the input beam such that it is transmitted to path 33 through the transmitting member 41, polarization reflective coating 43 and one-fourth wavelength plate 37. Coating 43 is arranged such that the polarization of the input beam is passed with insubstantial reflection while the reflected beam on path 34 sees coating 43 as a mirror and therefore is deflected along path 35 to detector 36.

The variable wedge 32, detector 36 and laser source 23 are suitably mounted on adjustable plate 24A. Plate 24A is adjustably supported on head arm 21 by two or more machine screws 38 first the collimated light source 23 input angle to the input surface of receptor member 40 is adjusted by pivoting the receptor member 40 about pivot point 39 within the cavity of member 41 for creating a circular beam to be transmitted toward path 33. After the described pivoting adjustment, the receptor surface has a fixed angle with respect to the reference line. This angle beta is selected so that the angle alpha causes input beam 30 to project a circular image on receptor surface 40R. Once this adjustment is made, receptor member 40 is suitable adhesively secured in the cavity to transmitting member 41. The adhesive can be inserted at 42 between the convex surface of receptor member 40 and the concave outwardly facing surface of the member 41 cavity and then cured once the adjustment is made. For example, using Norland 61 adhesive available from Morland Products, Inc. of New Brunswick, N.J., allows the adhesive to be used initially as a lubricant for facilitating the rotational adjustments. Then applying ultraviolet light to the adhesive cures it such that members 40 and 41 are fixably secured to each other. An advantage of the Norland 61 Kadhesive is that it is optically compatible with the transparent material used in members 40 and 41.

Once the laser 23 and receptor member 40 are adjusted on plate 24A, the plate is mounted on arm 21 as diagrammatically shown in FIG. 1A. Plate 24A is then adjusted such that light paths 33, 34 are appropriately aligned such that light path 35 leads to detector 36 on plate 24A. Machine screws 38 are then tightened completing the assembly with two independent adjustments.

Accordingly, there is shown a simple constructional practice for assemblying a variable wedge into an optical disk data recorder and providing two independent adjustments during the fabrication process. The first being, independently adjusting the angle of incidence between the center of beam 30 and the receptor member 40 input surface and the second is adjusting relationships between beam 34 and detector 36.

FIGS. 2 and 3 show two implementations of the FIG. 1 illustrated adjustable wedge 32. FIG. 2 illustrates a hemicylinder 40C, which receives the elliptical input beam 30 on its receptor surface 40R such that the major axis 31A is parallel to the axis 40A of the hemicylinder. The projection of the elliptical beam 30 onto the receptor member 40C centered at pivot point 39 (location can be any place on axis 40A) is circular because of the angle of incidence alpha between the beam 30 and the planar input surface of receptor member 40.

Similarly in FIG. 3, rather than hemicylinder 40C, a hemisphere 40S is the receptor member. Pivot point 39 is the center of hemisphere 40S. Hemisphere 40S is initially movably secured in the member 41A partial hemispherical 14 cavity about center input beam receiving point 39. After the described adjustment it is secured to member 41A as described in FIG. 1A. When using the hemisphere 40S rather than the hemicylinder 40C, an additional adjustment freedom of adjustment is provided.

While the invention has been particularly shown and described with reference to a preferred embodiment thereof, it will be understood by those skilled in the art that various changes in form and details may be made therein without departing from the spirit and scope of the invention.

What is claimed is:

1. An adjustable optical prism, having an integral polarizing beam splitter, including in combination:
    an optical input member having a hemispheric shape and consisting of transparent material exhibiting given optical properties including a given index of refraction and having a convex output surface with a center of radius about a given point and an input surface, said input surface having a planar input portion at said center of radius;
    an optical transmitting member having a concave hemispheric-shaped, outwardly-opening cavity with a center of radius about a given point located outside said optical transmitting member, the cavity being for movably receiving said optical input member such that said convex output surface engages said concave cavity for enabling said optical input member to pivot about said given point, an optical output surface on said optical transmitting member facing away from said concave cavity, and said optical transmitting member consisting of said transparent material exhibiting said given optical properties;
    a light polarization sensitive means disposed on said output surface for transmitting light having a given polarization and reflecting light having other than said given polarization such that light received through said optical input member may be transmitted along a light path extending from said output surface through said light polarization sensitive means and for reflecting light impinging on said output surface received from said light path; and
    a polarization adjusting member disposed in optical coupling relationship to said output surface and in said light path for adjusting the polarization of impinging light and for transmitting light transmitted from said optical input member and said optical transmitting member whereby adjustment of said optical input member with respect to said cavity adjusts the shape of any beam of light received thereon in accordance with the angle of said planar optical input portion with respect to the received beam of light.

2. An optical device including the adjustable optical prism set forth in claim 1, including in combination:
    a first frame supporting said optical transmitting member and said polarization adjusting member;
    a light beam source disposed on said first frame and having an output means for shining a light beam having a predetermined shape onto said planar optical input portion; and
    means interposed between said optical input member and said optical transmitting member to retain said optical input member in said hemispheric shaped cavity such that said planar optical input portion is maintained at a predetermined angle with respect to said output means light beam whereby the predetermined shape of said light beam is changed to a second shape as a function of said predetermined angle.

3. An optical device as set forth in claim 2 wherein said optical input member is a hemi-cylinder.

4. An optical device as set forth in claim 2 wherein said optical input member is a hemisphere.

5. An optical device as set forth in claim 2 further including an optical detector mounted on said first frame in a position to intercept said reflected light from said light polarization sensitive means.

6. An optical device as set forth in claim 5 further including optical utilization means including, in combination;
    a light reflecting surface and optical light path means in optical communication with said output surface of said optical transmitting member for receiving light from said output surface and supplying reflected light to said output surface; and
    a frame means in said optical utilization means supporting said optical light path means and having adjustable mounting means for mounting said first frame such that said optical input member can be adjusted to said predetermined angle for controllably adjusting beam shape before said first frame is adjustably mounted on said frame means.

7. In a method of assembling and adjusting an optical device which includes means for emitting collimated light having a given polarization along a path and reflecting means in optical communications with said means for emitting for reflecting said collimated light along a given path but in a predetermined polarization different from said given polarization, said optical device having a detecting device disposed to receive light reflected by said reflecting means;
    the steps of:
    selecting a polarization responsive beam splitter having said detecting device and a light beam source for emitting a beam of light integrally mounted therewith such that the detecting device can receive said reflected light from said beam splitter when an outwardly facing output surface of said beam splitter has a first predetermined polarization orientation with respect to said path, said beam splitter output surface for reemitting said light source emitted light and for receiving said reflected light, the beam splitter having an adjustable emitted light reception means, said adjustable emitted light reception means including a surface means facing away from said output surface disposed to receive said light source emitted light beam and is angularly adjustable with respect to said light beam source emitted light beam for receiving said light beam source light beam at adjustable angles of incidence;
    first, adjusting said adjustable emitted light reception means surface for receiving said emitted light in a manner that the reemitted light from said output surface is substantially aligned with said reflected light and that the reemitted light has a substantially circular cross-section; and second, adjustably affixing said beam splitter in said device and adjusting said output surface with respect to said reflecting means such that the reflected wave is deflected so as to impinge on said detector.

8. In an optical data recorder having a record medium for storing optically sensible data in a predetermined format and having a predetermined cross-sectional shape, transducer support means mounted in the data recorder, frame means for supporting said record medium and said transducer support means for relative movement such that a plurality of data storing areas of the record medium are accessible via said transducer support means, the improvement, including in combination:

first optical means on said transducer support means for directing a beam of light to said record medium and for receiving a beam of light reflected by said record medium, said first optical means having optical connection means;

a light beam source mounted on said transducer support means for emitting a beam of light having a predetermined cross-sectional shape other than the shape of the optically sensible data stored optically on the record medium;

a polarizing beam splitter on said transducer support means optically interposed between said light beam source and said first optical means, said beam splitter being for emitting said directed beam of light to said record medium, said beam splitter also being for receiving from said first optical means via said optical connection means said reflected beam of light and for deflecting said reflected beam of light along a detector light path;

a quarter-wave optical plate interposed between said polarization responsive beam splitter and said optical connection means, said optical plate being for changing the polarization of the light passing therethrough such that said polarization responsive beam splitter deflects said reflected light beam onto said detector light path;

a detector on said transducer support means being interposed in said detector light path such that the detector receives said deflected light beam, the detector having electrical circuit means responsive to the received deflected light beam for supplying output signals for indicating focus, data or tracking information; and said polarizing beam splitter having a light reception surface with a predetermined surface shape and said surface facing said light beam source at a predetermined angle with respect to said emitted light beam such that the projection of said predetermined cross-section of shape of said emitted light beam on said light reception surface is substantially changed to a second predetermined cross-sectional shape different from the predetermined cross-section of shape of said emitted light beam whereby the cross-sectional shapes of said directed, reflected and deflected light beams are compatible with said shape of the optically sensible data stored on the record medium.

9. The optical data recorder set forth in claim 8, further including, in combination:

adjustable support means on said transducer support means for adjustably mounting said light beam source, said polarizing beam splitter, said quarter-wave plate and said detector such that the directed and reflected light beams are alignable between said optical connection means and said polarizing beam splitter; and said polarizing beam splitter including a hemispherically-shaped light reception member having said light reception surface and a light transmitting member having a concave cavity for adjustably receiving said light reception member for enabling adjustment of said predetermined angle.

10. In the optical data recorder set forth in claim 9, wherein said light reception member is a hemicylinder and said concave cavity has a hemicylindrical shape.

11. In the optical data recorder set forth in claim 9, wherein said light reception member is a hemisphere and said concave cavity has a hemispherical shape.

* * * * *